(12) United States Patent
Liu et al.

(10) Patent No.: US 9,553,627 B2
(45) Date of Patent: Jan. 24, 2017

(54) PROTECTIVE CASE CAPABLE OF ENHANCING LIGHT PROMPTING EFFECT AND MANUFACTURING METHOD FOR SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Su-Tzong Liu, New Taipei (TW); Sheng-Ying Liu, Shenzhen (CN); Wei-Rong Xiao, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 17 days.

(21) Appl. No.: 14/755,299

(22) Filed: Jun. 30, 2015

(65) Prior Publication Data

US 2016/0315649 A1 Oct. 27, 2016

(30) Foreign Application Priority Data

Apr. 27, 2015 (CN) .......................... 2015 1 0203845

(51) Int. Cl.
| | | |
|---|---|---|
| H04B 1/3888 | (2015.01) | |
| B32B 37/14 | (2006.01) | |
| B32B 37/12 | (2006.01) | |
| A45C 11/00 | (2006.01) | |

(52) U.S. Cl.
CPC ............. *H04B 1/3888* (2013.01); *B32B 37/12* (2013.01); *B32B 37/14* (2013.01); *A45C 2011/002* (2013.01); *B32B 2439/62* (2013.01)

(58) Field of Classification Search
CPC ....... H04B 1/3888; B32B 37/12; B32B 37/14; B32B 2439/62; A45C 2011/002; H04M 1/0283

See application file for complete search history.

(56) References Cited

U.S. PATENT DOCUMENTS

| | | | | |
|---|---|---|---|---|
| 2010/0123666 | A1* | 5/2010 | Wickholm | H04M 1/0283 345/173 |
| 2010/0320882 | A1* | 12/2010 | Zhang | G06F 1/1626 312/204 |
| 2011/0175747 | A1* | 7/2011 | Small | G02B 6/0008 340/815.45 |

FOREIGN PATENT DOCUMENTS

WO  WO 2015012475 A1 * 1/2015 ............. A45C 11/00

* cited by examiner

*Primary Examiner* — Daniel Lai
(74) *Attorney, Agent, or Firm* — Zhigang Ma

(57) ABSTRACT

A manufacturing method for manufacturing a protective case, includes steps: a reflective film is prepared; a first filter film, a second filter film, and a third filter film of a color filter film, and then a decorative film are laminated on the reflective film in sequence to form a multilayer film structure; and a plurality of couples of relative positions of opposite surfaces of the multilayer film structure are processed via a bidirectional processing machine, thereby forming a plurality of light transmission openings penetrating the reflective film and the decorative film and further penetrating at least one or zero of first filter film, the second filter film, and the third filter film. A rear plate including the plurality of light transmission openings, the reflective film, the color filter film, and the decorative film is formed accordingly.

17 Claims, 16 Drawing Sheets ization method for manufacturing the protective
PROTECTIVE CASE CAPABLE OF ENHANCING LIGHT PROMPTING EFFECT AND MANUFACTURING METHOD FOR SAME This application claims priority to Chinese Patent Application No. 201510203845.5 filed on Apr. 27, 2015, the contents of which are incorporated by reference herein.

FIELD

The subject matter herein generally relates to protective cases for electronic device, and particularly to a protective case capable of enhancing light prompting effect and a manufacturing method for manufacturing the protective case.

BACKGROUND

Usually, an electronic device includes a prompt light to produce light prompting signal when a preset event is occurring on the electronic device, such as an event of receiving a short message. Commonly, in order to protect an electronic device, such as a mobile phone, a tablet computer from damage, a protective case is used cover the electronic device. However, the protective case reduces the effect of the light prompting signal.

BRIEF DESCRIPTION OF THE DRAWINGS

Implementations of the present technology will now be described, by way of example only, with reference to the attached figures.

DETAILED DESCRIPTION

Figure 1:
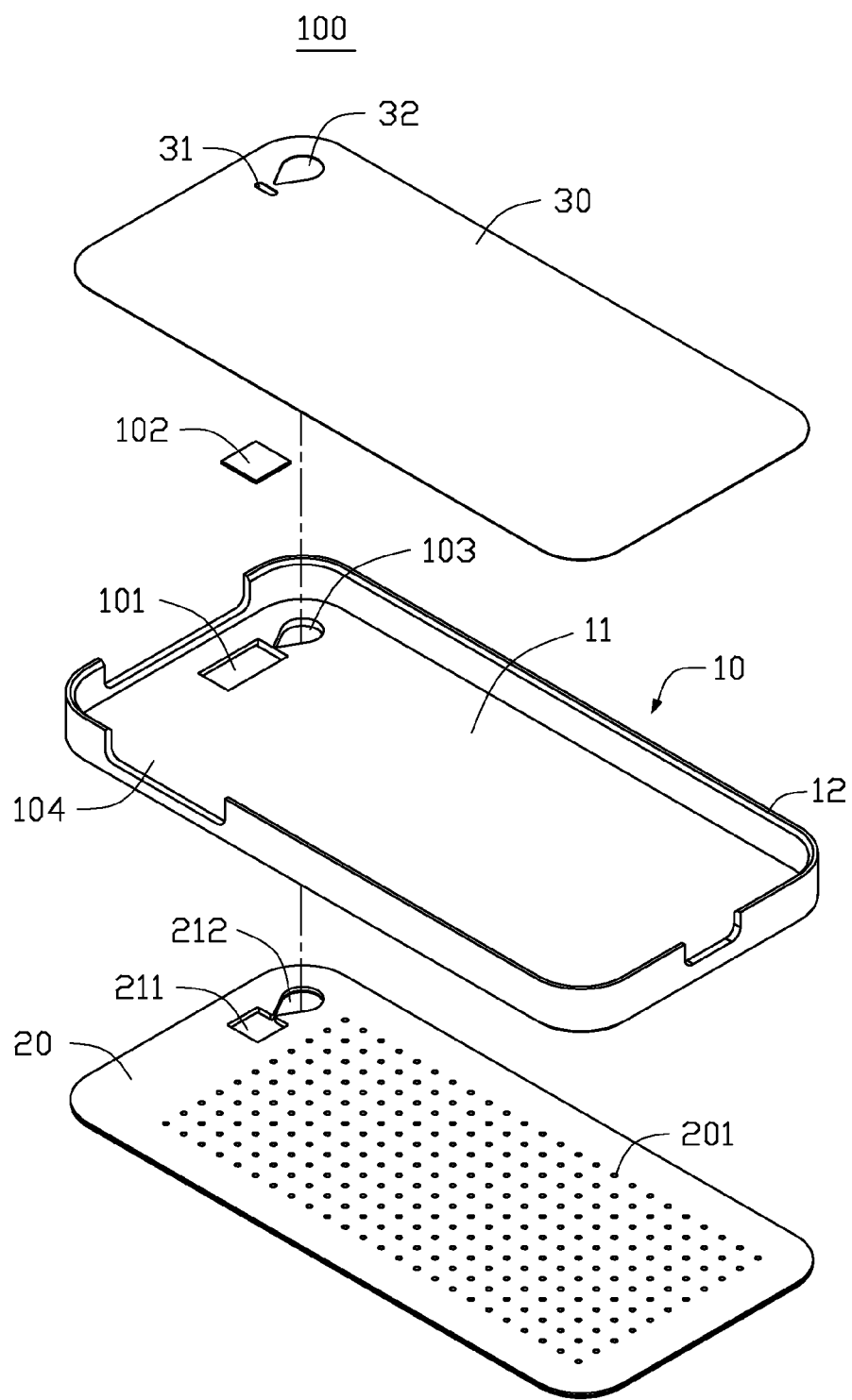
FIG. 1 is an exploded view of a protective case from a first angle of one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Figure 2:
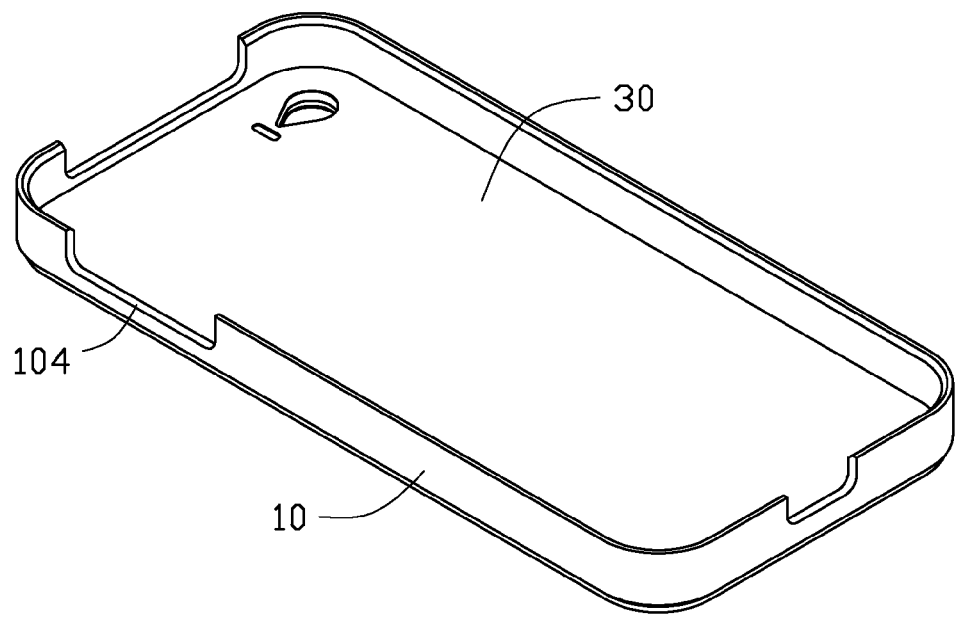
FIG. 2 is an integrated view of a protective case from a first angle of one embodiment.
Figure 3:
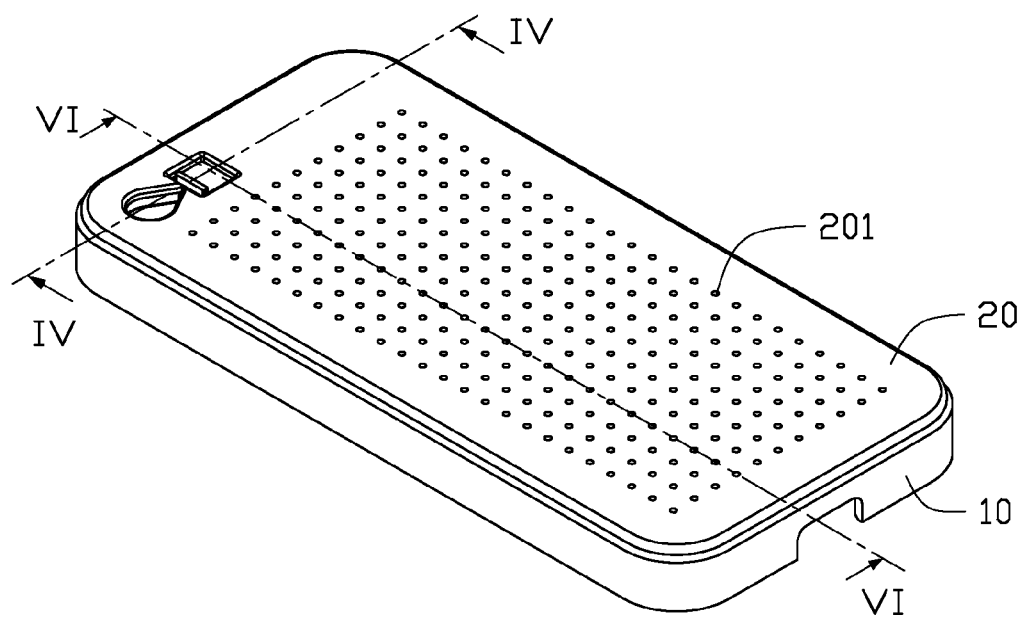
FIG. 3 is an integrated view of a protective case from a second angle of one embodiment.

FIG. 1 illustrates a protective case 100 includes a transparent shell 10 and a rear plate 20. The transparent shell 10 has a substantially rectangular backboard 11 and four sidewalls 12 extended from the backboard 11. Referring also to FIGS. 2-3, the transparent shell 10 is fixed on a rear surface of the backboard 11 of the transparent shell 10 as shown in FIG. 3. A size of the protective case 100 is substantially the same as a size of an electronic device (not shown), such as a mobile phone, a tablet computer, and the protective case 100 is used to cover the electronic device to protect the electronic device.

The transparent shell 10 is made of transparent or translucent materials, such as transparent or translucent plastic, transparent or translucent silicone, or the like. The transparent shell 10 further includes a flash opening 101 setting at a position corresponding to a flash of the electronic device to be covered by the protective case 100. The transparent shell 10 further includes a flash plate 102 moveably set in the transparent shell 10. In the embodiment, the flash plate 102 can move to cover the flash opening 101 or expose the flash opening 102 in response to user operation. In the embodiment, the flash opening 101 is formed on the backboard 11 of the transparent shell 10.

Figure 4:
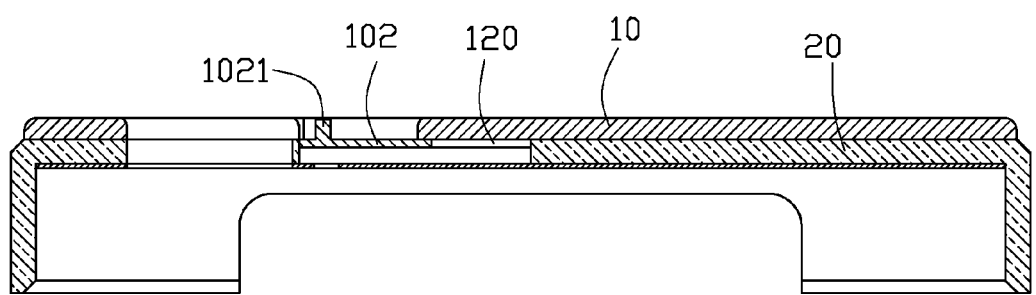
FIG. 4 is a cross-sectional view of the protective case of FIG. 3 along lines IV-IV of FIG. 3.

FIG. 4 illustrates the flash plate 102 is received in a receiving slot 120 of the transparent shell 10. The receiving slot 120 is coupled to the flash opening 101. The flash plate 102 includes an operating member 1021 setting at a surface (not labeled) of the flash plate 102 which faces the rear plate 20. Another surface (not labeled) of the flash plate 102 is a diffuse reflecting surface which faces the flash of the electronic device to be covered by the protective case 100 and is used to diffuse received light from the flash of the electronic device to be covered by the protective case 100. The operating member 1021 can be a protruding ridge. The flash plate 10 can be substantially received in the receiving slot 120 or moved out from the receiving slot 120 to cover the flash opening 101 in response to corresponding operations on the operating member 1021.

Figure 5:
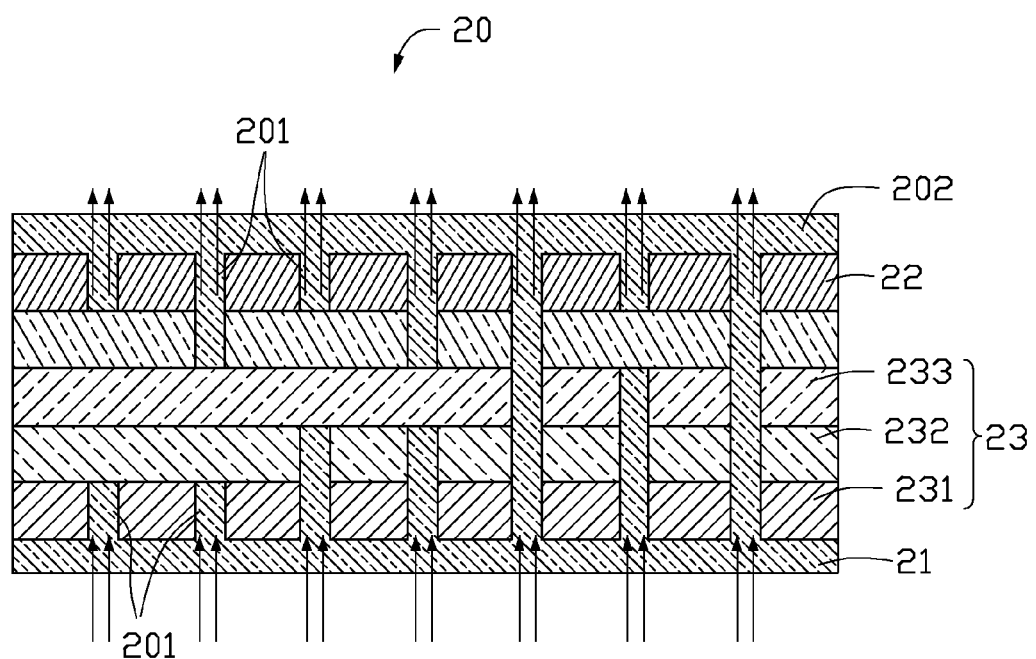
FIG. 5 is a diagrammatic view of a rear plate of a protective case of one embodiment.

FIG. 5 illustrates the rear plate 20 is a multilayer film and includes a reflective film 21 and a decorative film 22 laminated on the reflective film 21. A surface nearing the reflective film 21, of the rear plate 20, faces the rear surface of the backboard 11 of the transparent shell 10, and a reflective surface of the reflective film 21 also faces the rear surface of the backboard 11 of the transparent shell 10. The decorative film 22 can be made of colored and wearproof material, such as colored polyurethane, colored rubber, colored plastic, or the like. The decorative film 22 can include any suitable color and patterns. In the embodiment, the rear plate 20 further includes a number of light transmission openings 201 passing through or penetrating the reflective film 21 and the decorative film 22.

Figure 6:
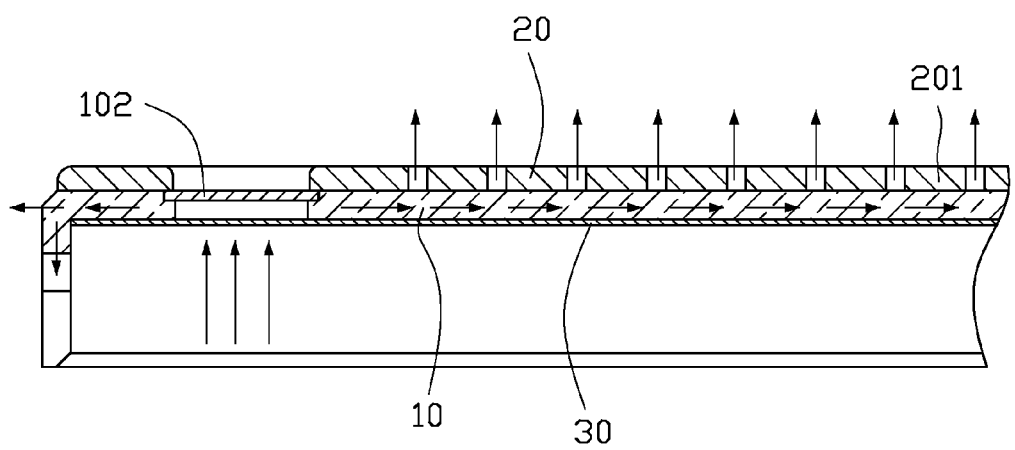
FIG. 6 is a cross-sectional view of the protective case of FIG. 3 along lines VI-VI of FIG. 3.
Figure 7:
FIGS. 7-13 are diagrammatic views showing a manufacturing process of the rear plate of FIG. 5.
Figure 8:
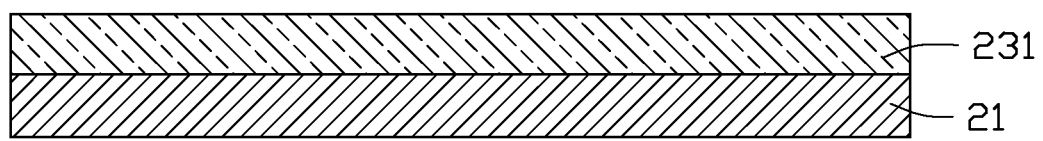
Figure 9:
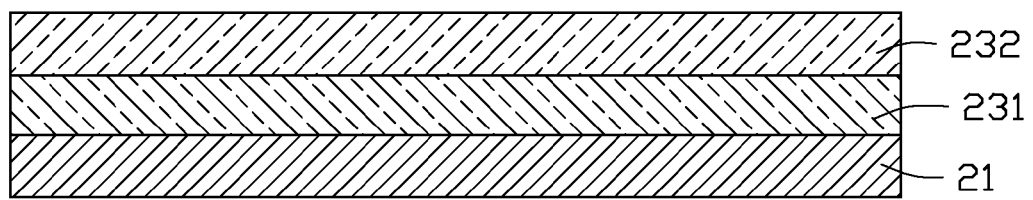
Figure 10:
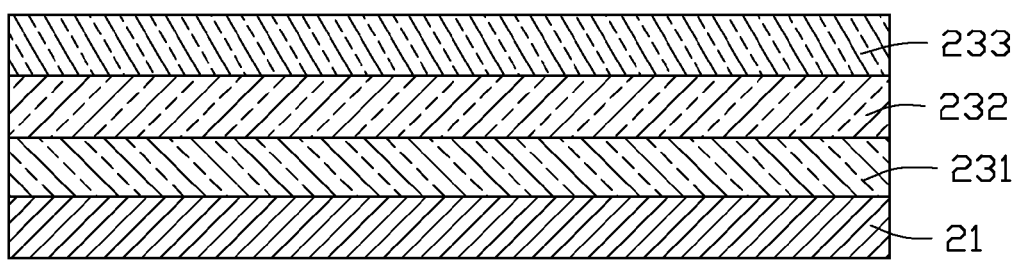
Figure 11:
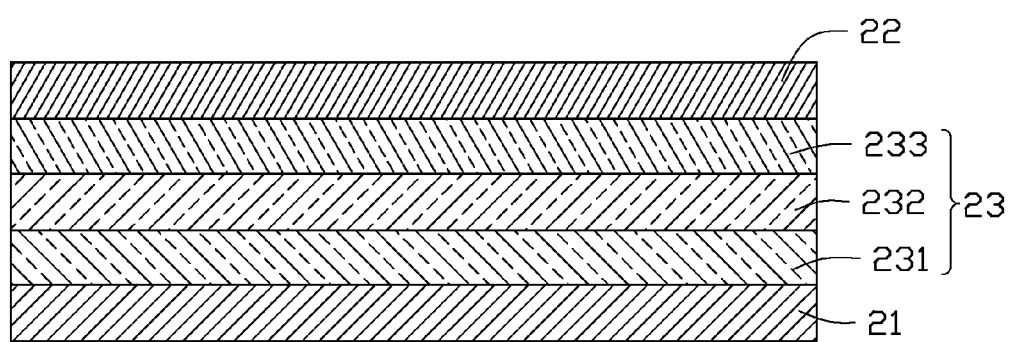
Figure 12:
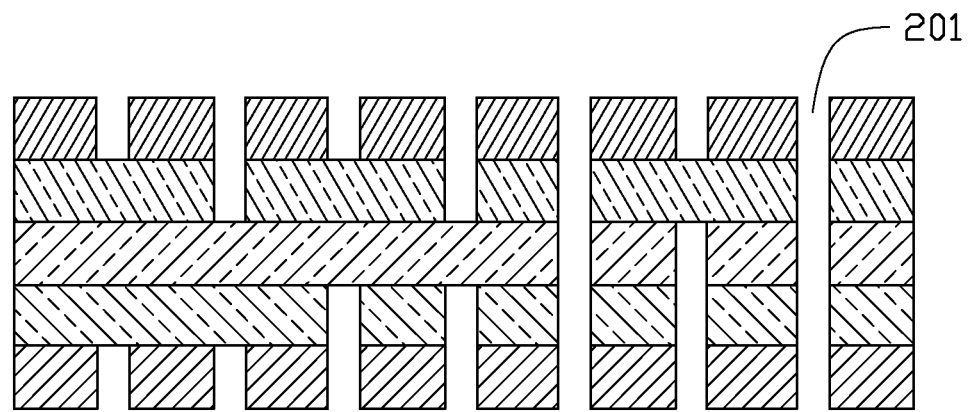

FIG. 6 illustrates a cross-sectional view of the protective case of FIG. 3 along lines VI-VI of FIG. 3, and further illustrates a light-guiding effect of the protective case 100. In one embodiment, if the user uses the protective case 100 to enhance the light prompting effect, the flash plate 102 can be moved out from the receiving slot 120, thus covering the flash opening 101. When the flash of the electronic device covered by the protective case 100 emits light in response to an occurrence of a preset event, such as a short message being received, the flash plate 102 at least partially reflects the light emitted by the flash of the electronic device to the transparent shell 10. The transparent shell 10 further guides the light to the light transmission openings 201 and the light is emitted via the light transmission openings 201 accordingly. The transparent shell 10 also guides a part of light to sidewalls 12 of the transparent shell 10 and the part of light is emitted via the sidewalls 12 of the transparent shell 10. Therefore, the light emitted by the flash can be guided to the whole protective case 100 and is emitted via different places of the protective case 100, thus enhancing the light prompting effect. Furthermore, due to the decorative film 22 being made of colored and wearproof material, a life time of the protective case 100 is prolonged.

In the embodiment, the reflective film 21 of the rear plate 20 can reflect the light to the transparent shell 10 again when receiving the light guided from the transparent shell 10, thus enabling the transparent shell 10 to guide more light to the light transmission openings 201, the luminance of the light emitted by the whole protective case 100 is enhanced accordingly.

FIG. 5 illustrates the rear plate 20 further includes a color filter film 23 between the reflective film 21 and the decorative film 22. In the embodiment, the reflective film 21, the color filter film 23, and the decorative film 22 are laminated from near to the transparent shell 20 to away from the transparent shell 10. Sizes of the reflective film 21, the color filter film 23, and the decorative film 22 are all the same.

The color filter film 23 includes a first filter film 231, a second filter film 232, and a third filter film 233 laminated in sequence. The first filter film 231 has a first color, the second filter film 232 has a second color, and the third filter film 233 has a third color. In the embodiment, each light transmission opening 201 further penetrates at least one of the first filter film 231, the second filter film 232, and the third filter film 233 or does not penetrate any of the first filter film 231, the second filter film 232, and the third filter film 233, after penetrating the reflective film 21 and the decorative film 22. Therefore, each light transmission opening 201 can include at least one of the first filter film 231, the second filter film 232, and the third filter film 233, or can be a through hole passing through all of the reflective film 21, the color filter film 23, and the decorative film 22. Therefore, different light transmission openings 201 can include different films, for example, one light transmission opening 201 can only penetrate the third filter film 233 and include the first filter film 231 and the second filter film 232, another light transmission opening 201 can only penetrate the first filter film 231 and include the second filter film 232 and the third filter film 233.

Due to the fact that different light transmission openings 201 can include different films or can be through holes, when the transparent shell 10 guides the light to different light transmission openings 201 and emits the light via the different light transmission openings 201, the light emitted via the different light transmission openings 201 would have different color, thus generating a colorful effect and further enhancing the light prompting effect.

In one embodiment, the reflective film 21 can be a white polyester film with high-reflectivity.

FIGS. 7-13 illustrate in one embodiment, a manufacturing process of the rear plate 20 includes: at first, as shown in FIGS. 7-12, preparing a reflective film 21, and laminating the first filter film 231, the second filter film 232, and the third filter film 233 of the color filter film 23, and then the decorative film 22 on the reflective film 21 in sequence to form a multilayer film structure. The multilayer film structure includes the reflective film 21, the color filter film 23, and then the decorative film 22 laminated in sequence. Later, processing two relative positions (namely, a position pair) of opposite surfaces of the multilayer film structure via a bidirectional processing machine (not shown), thereby forming the light transmission opening 201 that penetrates at least the reflective film 21 and the decorative film 22. Accordingly, a number of light transmission openings 201 can be generated by processing a number of relative positions of the opposite surface of the multilayer film structure via the bidirectional processing machine. In the embodiment, the bidirectional processing machine can be a bidirectional laser processing machine, and the bidirectional laser processing machine can generate two relative lasers to penetrate each two relative positions of opposite surfaces of the multilayer film structure, and form the number of light transmission openings 201 penetrating at least the reflective film 21 and the decorative film 22.

In one embodiment, strengths of each two relative lasers generated by the bidirectional laser processing machine are enough to ensure that the two relative lasers penetrate at least the reflective film 21 and the decorative film 22, and further penetrate at least one or zero of first filter film 231, the second filter film 232, and the third filter film 233. The strength of each laser of the two relative lasers generated by the bidirectional laser processing machine can be the same or different. The strength of the two relative lasers can be adjusted to enable one of the two relative lasers to penetrate the reflective film 21 and further penetrate at least one or zero of first filter film 231, the second filter film 232, and the third filter film 233 in sequence, and enable another one of the two relative lasers to penetrate the decorative film 22 and further penetrate at least one or zero of the third filter film 233, the second filter film 232, and first filter film 231 in sequence.

In another embodiment, the light transmission openings 201 can be formed by processing the opposite surfaces of the multilayer film structure including the reflective film 21, the color filter film 23, and the decorative film 22 by using other bidirectional processing machines, such as a bidirectional perforating machine.

Therefore, each light transmission opening 201 can be blocked by at least one of the first filter film 231, the second filter film 232, and the third filter film 233, or can be a through hole.

In one embodiment, the first filter film 231 can be a polyvinyl chloride film with a first color, the second filter film 232 can be a polyvinyl chloride film with a second color, and the third filter film 231 can be a polyvinyl chloride film with a third color. Laminating the first filter film 231, the second filter film 232, and the third filter film 233 of the color filter film 23, and then the decorative film 22 on the reflective film 21 in sequence to form the multilayer film structure as follows: the first filter film 231 is adhered on the reflective film 21 by adhesive, such as glue; after the adhesive is cured, the second filter film 232 is adhered on the first filter film 231 by adhesive; after the adhesive is cured, the third filter film 233 is adhered on the second filter film 232 by adhesive; lastly, the decorative film 22 is adhered on the third filter film 233 by adhesive. Therefore, in the embodiment, the first filter film 231, the second filter film 232, and the third filter film 233 are laminated via the adhesive to form the color filter film 23, and the color filter film 23 is adhered between the reflective film 21 and the decorative film 22 by the adhesive.

In another embodiment, the first filter film 231 can be a transparent resin coating with a first color, the second filter film 232 can be a transparent resin coating with a second color, and the third filter film 231 can be a transparent resin coating with a third color. Laminating the first filter film 231, the second filter film 232, and the third filter film 233 of the color filter film 23, and then the decorative film 22 on the reflective film 21 in sequence to form the multilayer film structure as follows: the transparent resin coating is coated with the first color on the reflective film 21 and the transparent resin coating with the first color is cured by ultraviolet to form the first filter film 231; the transparent resin coating with the second color is coated on the first filter film 231 and the transparent resin coating with the second color is cured by ultraviolet to form the second filter film 232; the transparent resin coating is coated with the third color on the second filter film 232 and the transparent resin coating with the third color is cured by ultraviolet to form the third filter film 233; lastly, the decorative film 22 is adhered on the third filter film 233 by adhesive.

In one embodiment, the first color as described above can be yellow, the second color as described above can be magenta, the third color as described above can be cyan. In other embodiments, the first color, the second color, and the third color can be any three different colors, such as red, green, and blue.

Figure 13:
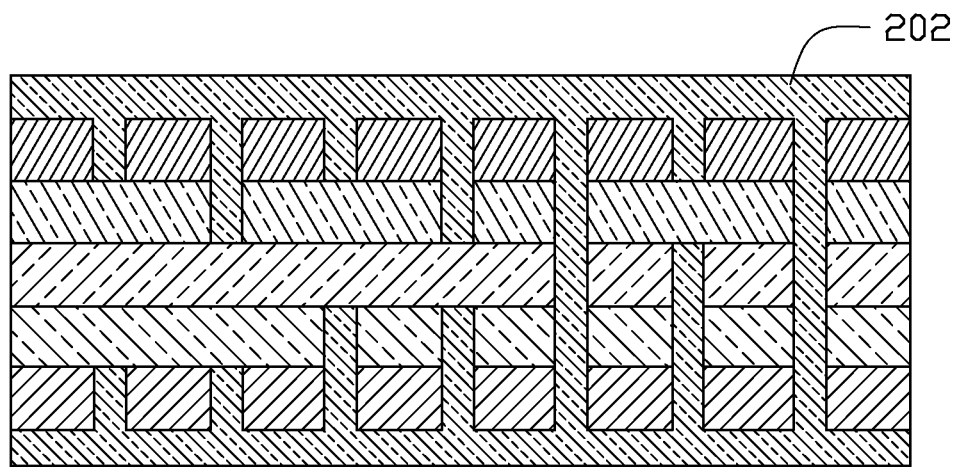

FIG. 13 illustrates in one embodiment, in order to prevent the light transmission openings 201 from gathering dust, the manufacturing process of the rear plate 20 further includes: transparent coatings are coated on an upper surface and a bottom surface of the rear plate to fill the light transmission openings 201, thus forming a transparent protection layer 202 covering the whole rear plate 20, and forming the rear plate 20 covered by the transparent protection layer 202. Namely, the rear plate 20 further includes the transparent protection layer 202 which wraps the whole rear plate 20 and fills the light transmission openings 201. In one embodiment, the transparent coating can be nanometer coatings, colloid, or gel with nanometer silica powders. After the transparent coating covering the rear plate 20 is cured, the transparent coating forms the protection layer 202 with high hardness and high optical transmittance.

In one embodiment, the rear plate 20 is fixed on the rear surface of the transparent shell 10 via a surface of the protection layer 202 which is at a side of the reflective film 21. The protection layer 202 is fixed on the transparent shell 10 via adhesive.

In the embodiment, the protective case 100 further includes a reflective plate 30, the reflective plate 30 is fixed on an inner surface of the backboard 11 of the transparent shell 10. The reflective plate 30 includes a flash opening 31. The size of the flash opening 31 is substantially the same as the size of a flash opening of the electronic device covered by the protective case 100. In the embodiment, the reflective plate 30 is very thin, such as 1 millimeter. A reflective surface of the reflective plate 30 faces the inner surface of the backboard 11 of the transparent shell 10, and is used to reflect the light emitted from the transparent shell 10 to the transparent shell 10 again, and increase the light guided to the light transmission openings 201 by the transparent shell 10. Therefore, the luminance of the light emitted by the protective case 100 is further increased.

FIG. 1 illustrates the transparent shell 10 further includes a camera opening 103 setting at a portion corresponding to a position of a camera of the electronic device covered by the protective case 100. The reflective plate 30 also includes a camera opening 32 corresponding to the camera opening 103 of the transparent shell 10. The rear plate 20 further includes a flash opening 211 and a camera opening 212 at the portions corresponding to the flash and the camera of the electronic device. Therefore, due to the fact that the flash openings and the camera openings exist in the transparent shell 10, the reflective plate 30, and the rear plate 20, the camera and flash of the electronic device can be used as normally. In the embodiment, the camera opening 103 of the transparent shell 10 is also formed on the backboard 11 of the transparent shell 10.

As shown in FIG. 1, the sidewall of the transparent shell 10 further can include at least one opening 104 according to at least one key setting at the sidewall of the electronic device.

In one embodiment, sizes of the flash opening 201 of the transparent shell 10 and the flash opening 211 of the rear plate 20 are greater than the flash opening of the electronic device.

In one embodiment, as shown in FIGS. 1-3, the light transmission openings 201 are circular holes.

Figure 14:
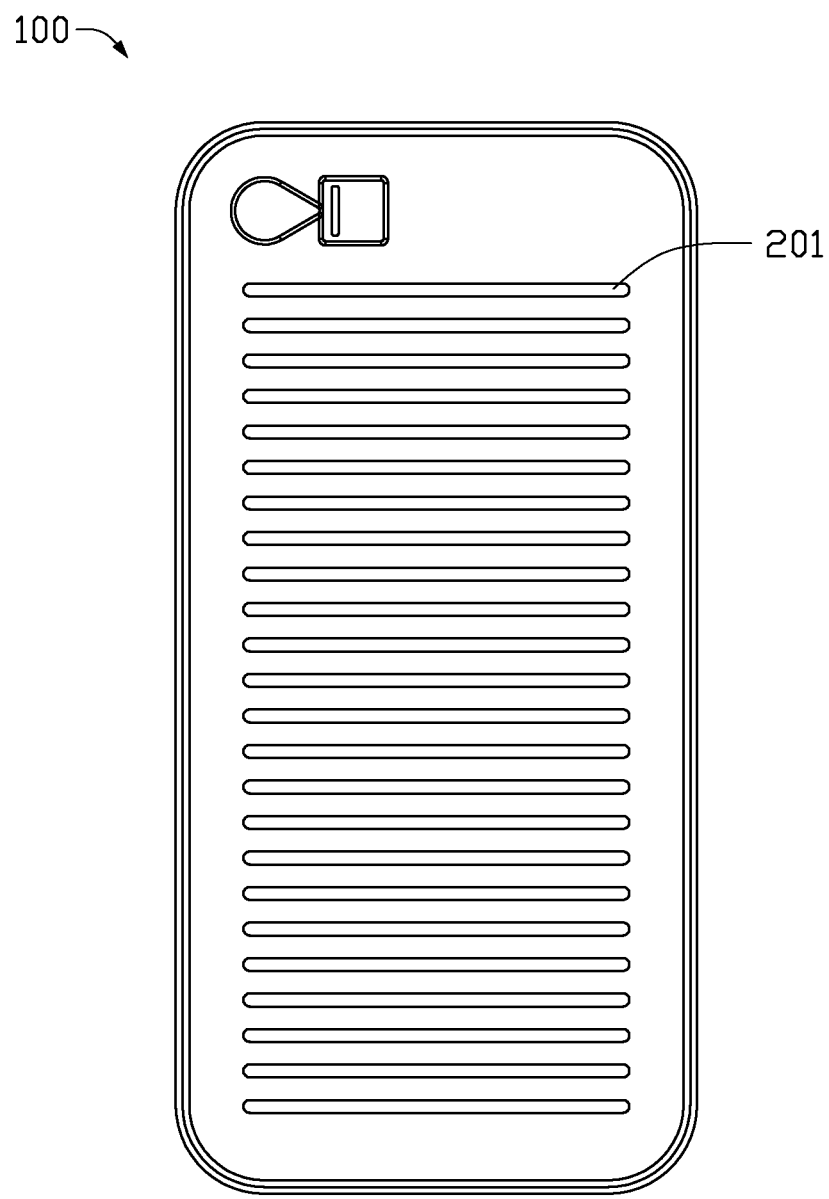
FIG. 14 is a diagrammatic view showing light transmission openings of a protective case of another embodiment.

FIG. 14 illustrates in another embodiment, each light transmission opening 201 can be a narrow slot.

Figure 15:
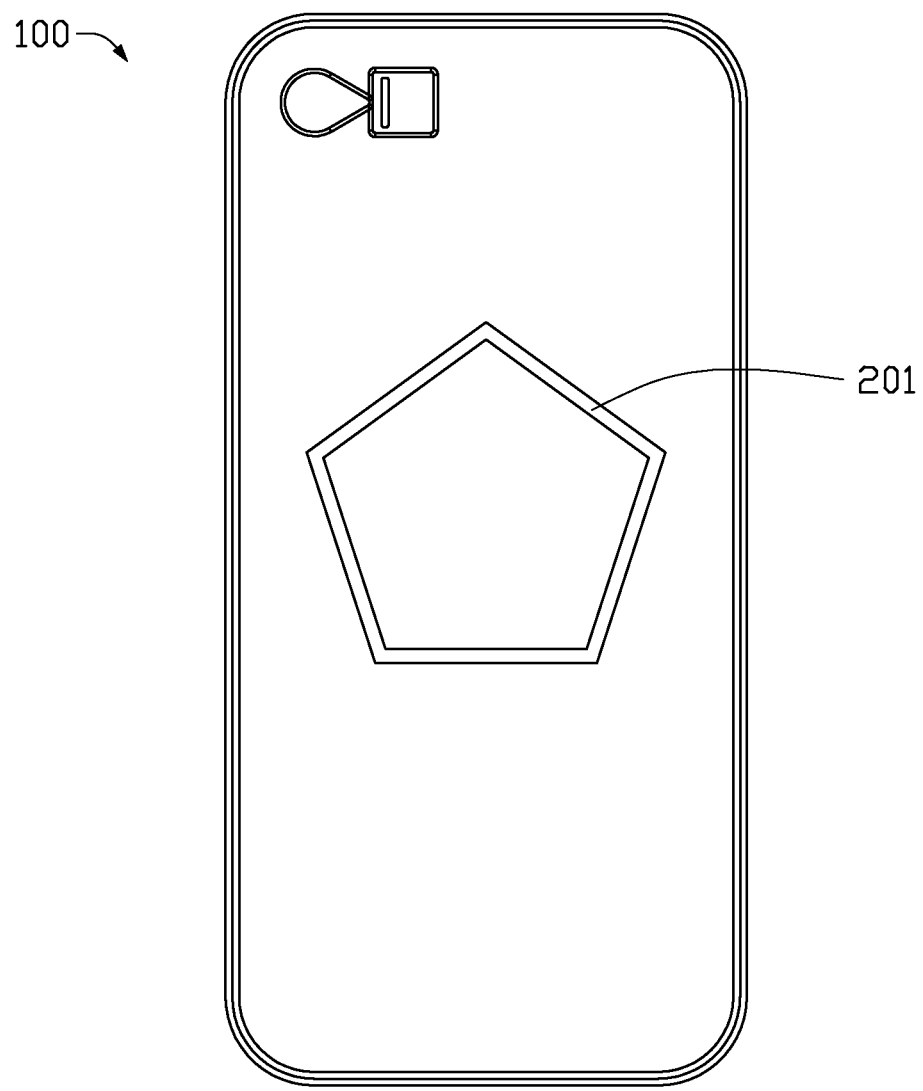
FIG. 15 is a diagrammatic view showing a light transmission opening of a protective case of another embodiment.

FIG. 15 illustrates in yet another embodiment, the rear plate 20 only includes one light transmission opening 201, and the light transmission opening 201 is an enclosed narrow slot with particular shape, such as a pentagonal narrow slot as shown in FIG. 15. In other embodiments, the rear plate 20 can include a number of light transmission openings 201, and each of the light transmission openings 201 is an enclosed narrow slot with particular shape.

Figure 16:
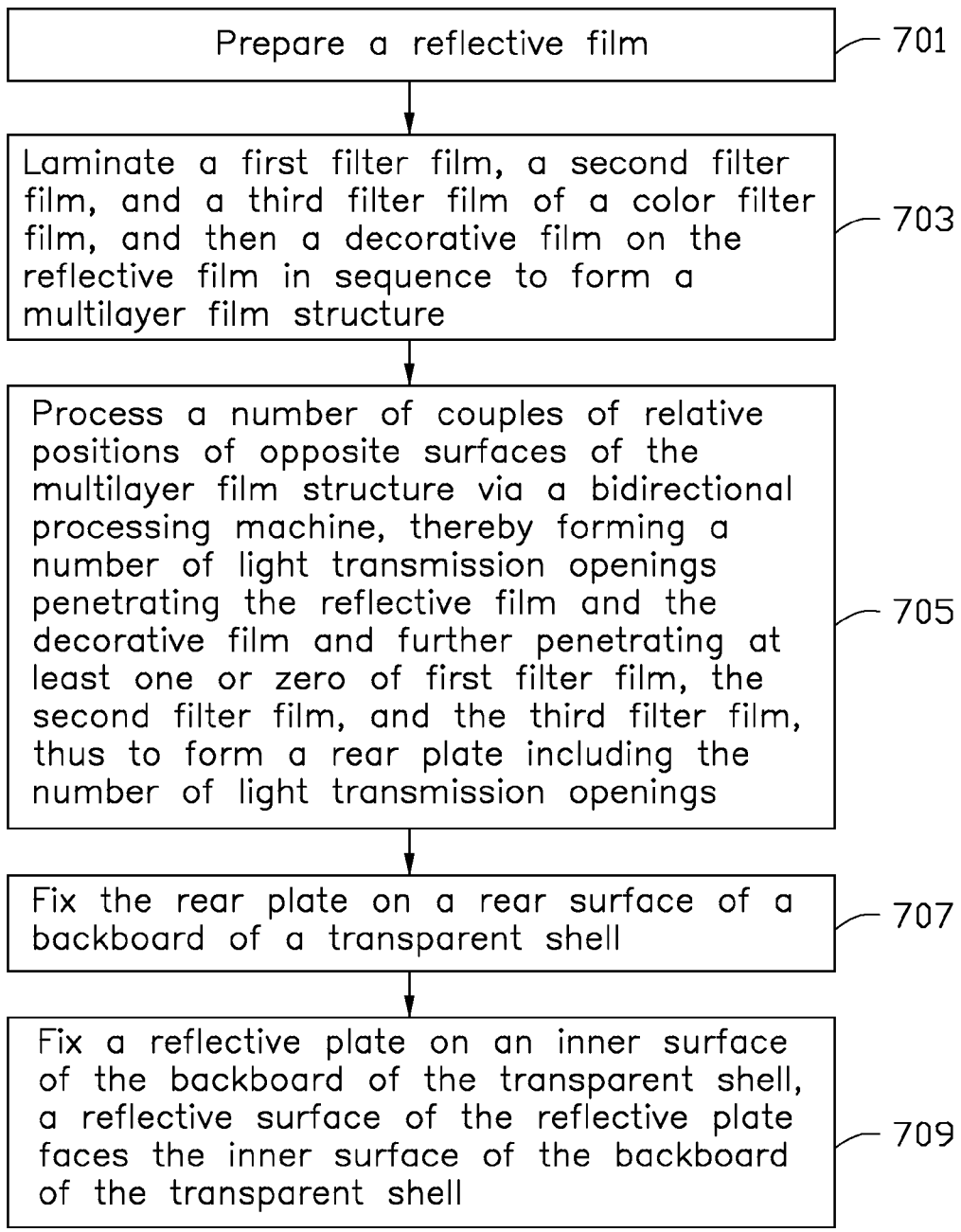
FIG. 16 is a flowchart illustrating a manufacturing method of a protective case of an embodiment.

FIG. 16 illustrates a flowchart of a manufacturing method for manufacturing a protective case of an embodiment. The method is provided by way of example, as there are a variety of ways to carry out the method. The method described below can be used to manufacturing the protective case illustrated in FIG. 1, for example, and various elements of these figures are referenced in explaining the example method. Each block shown in FIG. 16 represent one or more processes, methods, or subroutines carried out in the example method. Additionally, the illustrated order of blocks is by example only and the order of the blocks can be changed. The example method can begin at block 701.

At block 701: A reflective film is prepared. In one embodiment, the reflective film can be obtained by cutting a large area white polyester film with high-reflectivity.

At block 703: a first filter film, a second filter film, and a third filter film of a color filter film, and then a decorative film are laminated on the reflective film in sequence to form a multilayer film structure. In one embodiment, the first filter film can be a polyvinyl chloride film with a first color, the second filter film can be a polyvinyl chloride film with a second color, and the third filter film can be a polyvinyl chloride film with a third color. The first filter film is adhered on the reflective film by adhesive; after the adhesive is cured, the second filter film is adhered on the first filter film by adhesive; after the adhesive is cured, the third filter film is adhered on the second filter film by adhesive; lastly, the decorative film is adhered on the third filter film by adhesive.

In another embodiment, the first filter film can be a transparent resin coating with a first color, the second filter film 232 can be a transparent resin coating with a second color, and the third filter film 231 can be a transparent resin coating with a third color. The transparent resin coating with the first color is coated on the reflective film and the transparent resin coating with the first color is cured by ultraviolet light to form the first filter film; the transparent resin coating with the second color is coated on the first filter film and the transparent resin coating with the second color is cured by ultraviolet light to form the second filter film; the transparent resin coating with the third color is coated on the second filter film and the transparent resin coating with the third color is cured by ultraviolet light to form the third filter film; lastly, the decorative film is adhered on the third filter film by adhesive.

At block 705: a number of relative positions of opposite surfaces of the multilayer film structure is processed via a bidirectional processing machine, thereby defining a number of light transmission openings penetrating the reflective film and the decorative film and further penetrating at least one or zero of first filter film, the second filter film, and the third filter film, thus to form a rear plate including the number of light transmission openings. In one embodiment, the bidirectional processing machine can be a bidirectional laser processing machine, and the bidirectional laser processing machine can generate two relative lasers to penetrate each couple of relative positions of opposite surfaces of the multilayer film structure, and form the number of light transmission openings penetrating at least the reflective film and the decorative film.

At block 707: the rear plate including the number of light transmission openings is fixed on a rear surface of a backboard of a transparent shell, the transparent shell at least includes a flash opening and a flash plate, the flash plate can be moved to cover the flash opening or expose the flash opening in response to user operation.

At block 709: a reflective plate is fixed on an inner surface of the backboard of the transparent shell, the reflective plate includes a flash opening and a reflective surface of the reflective plate faces the inner surface of the backboard of the transparent shell.

In one embodiment, after the block 705, the manufacturing method further can include: transparent coatings are coated on a upper surface and a bottom surface of the rear plate to fill the light transmission openings, thus forming a transparent protection layer covering the whole rear plate, and forming the rear plate covered by the transparent protection layer.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A protective case for wrapping and protecting an electronic device, the protective case comprising:
   a transparent shell comprising a backboard, four sidewalls extended from the backboard, a first flash opening, and a flash plate, wherein the first flash opening is set at a position of the backboard, and the position corresponds to a position of a flash of the electronic device to be covered by the protective case, the flash plate is moveable set in the transparent shell and is configured to move to cover the first flash opening or expose the first flash opening in response to user operation; and
   a rear plate fixed on a rear surface of the backboard of the transparent shell, comprising a reflective film, a decorative film laminated on the reflective film, and a plurality of light transmission openings penetrating the reflective film and the decorative film, wherein the decorative film comprises any suitable color and pattern, and a reflective surface of the reflective film faces the rear surface of the backboard of the transparent shell.

2. The protective case according to claim 1, wherein the rear plate further comprises a color filter film between the reflective film and the decorative film, the color filter film comprises a first filter film with, a second filter film with, and a third filter film laminated in sequence and with different color, and each of the plurality of light transmission openings further penetrates at least one or zero of the first filter film, the second filter film, and the third filter film after penetrating the reflective film and the decorative film.

3. The protective case according to claim 2, wherein the rear plate further comprises a transparent protection layer coating on an upper surface and a bottom surface of the rear plate and filling the light transmission openings.

4. The protective case according to claim 2, further comprising a reflective plate fixed on an inner surface of the backboard of the transparent shell, wherein the reflective plate comprises a second flash opening setting at a position corresponding to the flash of the electronic device to be covered by the protective case, and a reflective surface of the reflective plate faces the inner surface of the backboard of the transparent shell.

5. The protective case according to claim 4, wherein each of the transparent shell, the reflective plate, and the rear plate further comprises a camera opening setting at a portion corresponding to a position of a camera of the electronic device covered by the protective case, the rear plate further comprises a third flash opening setting at the portion corresponding to the flash of the electronic device.

6. The protective case according to claim 2, wherein the first filter film is a polyvinyl chloride film with a first color, the second filter film is a polyvinyl chloride film with a second color, and the third filter film is a polyvinyl chloride film with a third color, the first filter film, the second filter film, and the third filter film are laminated with each other by adhesive to form the color filter film, and the color filter film is adhered between the reflective film and the decorative film by adhesive.

7. The protective case according to claim 2, wherein the first filter film is a transparent resin coating with a first color, the second filter film is a transparent resin coating with a second color, and the third filter film is a transparent resin coating with a third color, the first filter film, the second filter film, and the third filter film are laminated on the reflective film in sequence by ultraviolet, and the decorative film is adhered on the third filter film by adhesive.

8. The protective case according to claim 2, wherein the light transmission openings are selected from a group consisting of circular holes, narrow slots, and enclosed narrow slots with particular shape.

9. A manufacturing method for manufacturing a protective case, the method comprising:
   preparing a reflective film;
   laminating a first filter film, a second filter film, and a third filter film of a color filter film, and then a decorative film on the reflective film in sequence to form a multilayer film structure; and
   processing a plurality of relative positions of opposite surfaces of the multilayer film structure via a bidirectional processing machine, thereby forming a plurality of light transmission openings penetrating the reflective film and the decorative film and further penetrating at least one or zero of the first filter film, the second filter film, and the third filter film, thus to form a rear plate comprising the plurality of light transmission openings, the reflective film, the color filter film, and the decorative film.

10. The method according to claim 9, further comprising:
fixing the rear plate on a rear surface of a backboard of a transparent shell via a surface nearing the reflective film, of the rear plate, wherein the transparent shell at least comprises a flash opening and a flash plate, the flash plate move to cover the flash opening or expose the flash opening in response to user operation.

11. The method according to claim 10, wherein the first filter film is a polyvinyl chloride film with a first color, the second filter film is a polyvinyl chloride film with a second color, and the third filter film is a polyvinyl chloride film with a third color, the step of laminating a first filter film, a second filter film, and a third filter film of a color filter film, and then a decorative film on the reflective film in sequence to form a multilayer film structure comprises:
  adhering the first filter film on the reflective film by adhesive;
  adhering the second filter film on the first filter film by adhesive;
  adhering the third filter film on the second filter film by adhesive; and
  adhering the decorative film on the third filter film by adhesive.

12. The method according to claim 10, wherein the first filter film is a transparent resin coating with a first color, the second filter film is a transparent resin coating with a second color, and the third filter film is a transparent resin coating with a third color, the step of laminating a first filter film, a second filter film, and a third filter film of a color filter film, and then a decorative film on the reflective film in sequence to form a multilayer film structure comprises:
  coating the transparent resin coating with the first color on the reflective film and curing the transparent resin coating with the first color by ultraviolet to form the first filter film;
  coating the transparent resin coating with the second color on the first filter film and curing the transparent resin coating with the second color by ultraviolet to form the second filter film;
  coating the transparent resin coating with the third color on the second filter film and curing the transparent resin coating with the third color by ultraviolet to form the third filter film; and
  adhering the decorative film on the third filter film by adhesive.

13. The method according to claim 10, further comprising:
  fixing a reflective plate on an inner surface of the backboard of the transparent shell, the reflective plate includes a flash opening and a reflective surface of the reflective plate faces the inner surface of the backboard of the transparent shell.

14. The method according to claim 9, further comprising:
coating transparent coating on a upper surface and a bottom surface of the rear plate to fill the light transmission openings, thus to form a transparent protection layer covering the whole rear plate, and form the rear plate covered by the transparent protection layer accordingly.

15. The method according to claim 9, wherein the step of processing a plurality of relative positions of opposite surfaces of the multilayer film structure via a bidirectional processing machine comprises:
  penetrating the plurality of relative positions of opposite surfaces of the multilayer film structure via a plurality of relative lasers generated by a bidirectional laser processing machine,
  adjusting strengths of each two relative lasers to enable one of the two relative lasers to penetrate the reflective film and further to penetrate at least one or zero of the first filter film, the second filter film, and the third filter film in sequence, and enable another one of the two relative lasers to penetrate the decorative film and further to penetrate at least one or zero of the third filter film, the second filter film, and first filter film in sequence.

16. A protective case for an electronic device having a flash, the protective case comprising:
  a transparent shell configured to cover at least a portion of the electronic device, the shell having a flash opening to allow light from the flash to emerge from the shell;
  a light diffusing member mounted on the shell and moveable between an extended position in front of the flash opening and a retracted position away from the flash opening;
  a plate fixed on the transparent shell, comprising at least an opaque film with a plurality of holes therein;
  wherein when the light diffusing member is in the retracted position, light from the flash substantially entirely emerges from the flash opening;
  wherein when the light diffusing member is in the extended position, light from the flash is at least partially reflected into the transparent shell and emerges through at least the plurality of holes in the rear plate.

17. The protective case of claim 16, wherein the opaque film is a reflective film.

* * * * *